(12) United States Patent
Wu et al.

(10) Patent No.: US 12,722,314 B2
(45) Date of Patent: Sep. 1, 2026

(54) ROBOT JOINT DEVICE

(71) Applicant: INDUSTRIAL TECHNOLOGY RESEARCH INSTITUTE, Chutung (TW)

(72) Inventors: Hao-Yan Wu, Taoyuan City (TW); Yan-Ting Chen, Linluo Township (TW); Chien-Yu Wu, Kouhu Township (TW); Su-Jhen Lin, Kaohsiung City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 19/002,131

(22) Filed: Dec. 26, 2024

(65) Prior Publication Data

US 2026/0124770 A1 May 7, 2026

(30) Foreign Application Priority Data

Nov. 5, 2024 (TW) ................................ 113142343

(51) Int. Cl.
*B25J 17/00* (2006.01)
*B25J 17/02* (2006.01)

(52) U.S. Cl.
CPC ................................ *B25J 17/0283* (2013.01)

(58) Field of Classification Search
CPC .... B25J 17/0275; B25J 17/0283; B25J 9/102; B25J 17/0266; B25J 9/06
See application file for complete search history.

(56) References Cited

U.S. PATENT DOCUMENTS 3,973,469 A * 8/1976 Humen ..................... F01C 3/06 91/196
4,194,437 A * 3/1980 Rosheim ............. B25J 17/0275 92/120

(Continued)

FOREIGN PATENT DOCUMENTS

CN 105773578 A 7/2016
CN 111906814 A 11/2020

(Continued)

OTHER PUBLICATIONS

Abe et al., "ABENICS: Active Ball Joint Mechanism With Three-DoF Based on Sperical Gear Meshings", IEEE Transactions on Robotics, vol. 37, No. 5, Oct. 2021, pp. 1806-1825.

(Continued)

*Primary Examiner* — Zakaria Elahmadi
(74) *Attorney, Agent, or Firm* — Birch, Stewart, Kolasch & Birch, LLP

(57) ABSTRACT

A robot joint device includes a joint component, a first pivot component, a second pivot component and a third pivot component. The joint component includes a first pivot shaft, a second pivot shaft and a third pivot shaft. The first pivot component, the second pivot component and the third pivot component are pivotally connected to the first pivot shaft, the second pivot shaft and the third pivot shaft respectively. The joint component further comprises a joint body, and the joint body is at least a portion of a sphere, and the first pivot shaft, the second pivot shaft and the third pivot shaft are connected to the joint body, and a first central axis of the first pivot shaft, a second central axis of a second pivot shaft and a third central axis of a third pivot shaft pass through a center of the joint body.

11 Claims, 14 Drawing Sheets

(56) References Cited

U.S. PATENT DOCUMENTS

| | | | | | |
|---|---|---|---|---|---|
| 4,628,765 | A * | 12/1986 | Dien | B25J 17/0275 | 901/29 |
| 4,911,033 | A * | 3/1990 | Rosheim | B25J 17/0283 | 475/341 |
| 5,101,681 | A * | 4/1992 | Shpigel | B25J 19/0029 | 74/490.06 |
| 5,697,256 | A * | 12/1997 | Matteo | B25J 9/104 | 74/490.06 |
| 6,871,563 | B2 * | 3/2005 | Choset | B25J 17/0275 | 901/29 |
| 10,155,309 | B1 | 12/2018 | Blank | | |
| 11,364,758 | B2 * | 6/2022 | Sieve | F16C 41/00 | |
| 2009/0084219 | A1 * | 4/2009 | Rosheim | F16M 11/18 | 74/5 R |
| 2012/0103126 | A1 * | 5/2012 | Li | B25J 17/0241 | 74/490.05 |
| 2018/0111264 | A1 | 4/2018 | Rosheim | | |
| 2021/0262517 | A1 * | 8/2021 | Bronswick | B60G 7/005 | |
| 2023/0193986 | A1 | 6/2023 | Tadakuma et al. | | |

FOREIGN PATENT DOCUMENTS

| | | | | |
|---|---|---|---|---|
| CN | 113786240 | A | 12/2021 | |
| CN | 110382181 | B | 10/2022 | |
| CN | 112720405 | B | 12/2023 | |
| CN | 118721167 | A | 10/2024 | |
| EP | 1541897 | B1 * | 11/2010 | F16H 21/48 |
| JP | 6977235 | B2 | 12/2021 | |
| JP | 7054495 | B2 | 4/2022 | |
| JP | 2024-71978 | A | 5/2024 | |
| TW | I720397 | B | 3/2021 | |
| TW | 202415509 | A | 4/2024 | |
| TW | I840049 | B | 4/2024 | |
| WO | WO 2015/090614 | A1 | 6/2015 | |
| WO | WO-2024089357 | A1 * | 5/2024 | B25J 19/0029 |

OTHER PUBLICATIONS

Feller et al., "Mechanical Design and Analysis of a Novel Three-Legged, Compact, Lightweight, Omnidirectional, Serial-Parallel Robot with Compliant Agile Legs", Robotics, 2022, vol. 11, pp. 1-43.

Lee et al., "A Novel Design of Extended Coaxial Spherical Joint Module for a New Modular Type-Multiple DOFs Robotic Platform", 2018 IEEE/RSJ International Conference on Intelligent Robots and Systems (IROS), Madrid, Spain, Oct. 2018, pp. 955-960.

Liu et al., "Analytical Investigation on Torque of Three-Degree-of-Freedom Electromagentic Actuator for Image Stabilization", Applied Sciences, vol. 11, 2021, pp. 1-14.

Shao, Yen-Hsiang, "Conceptual Designs and Evaluation of Integrated Multi-Propulsion Power trains", Department of Mechanical Engineering, College of Engineering, National Taiwan University, Master Thesis, Jun. 2014, total 125 pages.

Tursynbek et al., "Modeling and Simulation of Spherical Parallel Manipulators in CoppeliaSim (V-REP) Robot Simulator Software", IEEE, 2020, total 6 pages.

* cited by examiner

ROBOT JOINT DEVICE

This application claims the benefit of Taiwan application Serial No. 113142343, filed Nov. 5, 2024, the disclosure of which is incorporated by reference herein in its entirety.

TECHNICAL FIELD

The disclosure relates in general to a robot joint device.

BACKGROUND

The development of multiple degrees of freedom (DoF) in robot joints of conventional robotic arms is generally composed of a number of joints connected in series. However, this design will lead to disadvantages such as heavy weight and large volume of the robot joints, and it is difficult to achieve realistic motion characteristics, thus limiting the feasibility of its application. Therefore, how to improve the aforementioned conventional problems is one of the goals of those in this technical field.

SUMMARY

According to an embodiment, a robot joint device is provided. The robot joint device includes a joint component, a first pivot component, a second pivot component and a third pivot component. The joint component includes a first pivot shaft, a second pivot shaft and a third pivot shaft. The first pivot component is pivotally connected to the first pivot shaft. The second pivot component is pivotally connected to the second pivot shaft. The third pivot component is pivotally connected to the third pivot shaft. The joint component further includes a joint body, and the joint body is at least a portion of a sphere, and the first pivot shaft, the second pivot shaft and the third pivot shaft are connected to the joint body, and a first central axis of the first pivot shaft, a second central axis of a second pivot shaft and a third central axis of a third pivot shaft pass through a center of the joint body.

According to another embodiment, a robot joint device is provided. The robot joint device includes single joint component, a plurality of pivot components and a plurality of driving mechanisms. The pivot components are pivotally connected to the single joint component. The driving mechanisms are configured to independently control movements of the pivot components. The single joint further includes a joint body and a plurality of pivot shafts, the joint body is at least a portion of a sphere, the pivot shafts are connected to the joint body, and a central axis of each pivot component passes through a center of the joint body.

The above and other aspects of the disclosure will become better understood with regard to the following detailed description of the preferred but non-limiting embodiment(s). The following description is made with reference to the accompanying drawings.

DETAILED DESCRIPTION

Figure 1:
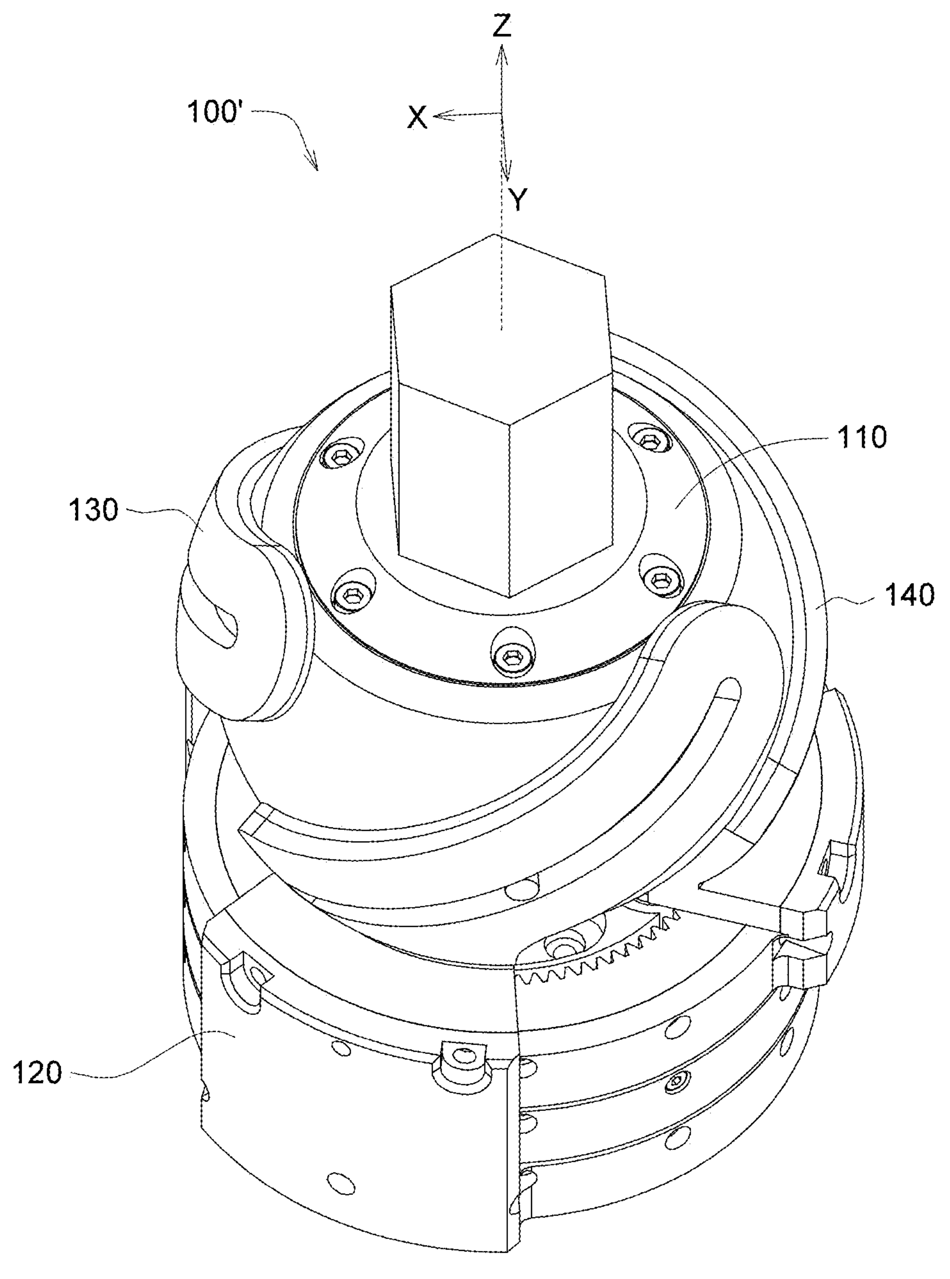
FIG. 1 illustrates a schematic diagram of a robot joint device according to an embodiment of the present invention.

Referring to FIG. 1, FIG. 1 illustrates a schematic diagram of a robot joint device 100' according to an embodiment of the present invention. The robot joint device 100' includes a joint component 110, a first pivot component 120, a second pivot component 130 and a third pivot component 140. The first pivot component 120, the second pivot component 130 and the third pivot component 140 are pivotally connected to the joint component 110.

In the present embodiment, the first pivot component 120, the second pivot component 130 and the third pivot component 140 are pivotally connected to the same joint component 110, and it may reduce an outer size of the robot joint device 100' and lower the weight of the robot joint device. 100' of (lightweight advantage). As a result, the robot joint device 100' may help achieve realistic movement characteristics. In addition, the first pivot component 120, the second pivot component 130 and the third pivot component 140 may respectively move relative to the joint component 110 to drive the joint component 110 to swing around at least one of X-axis, Y-axis and Z-axis.

Figure 2A:
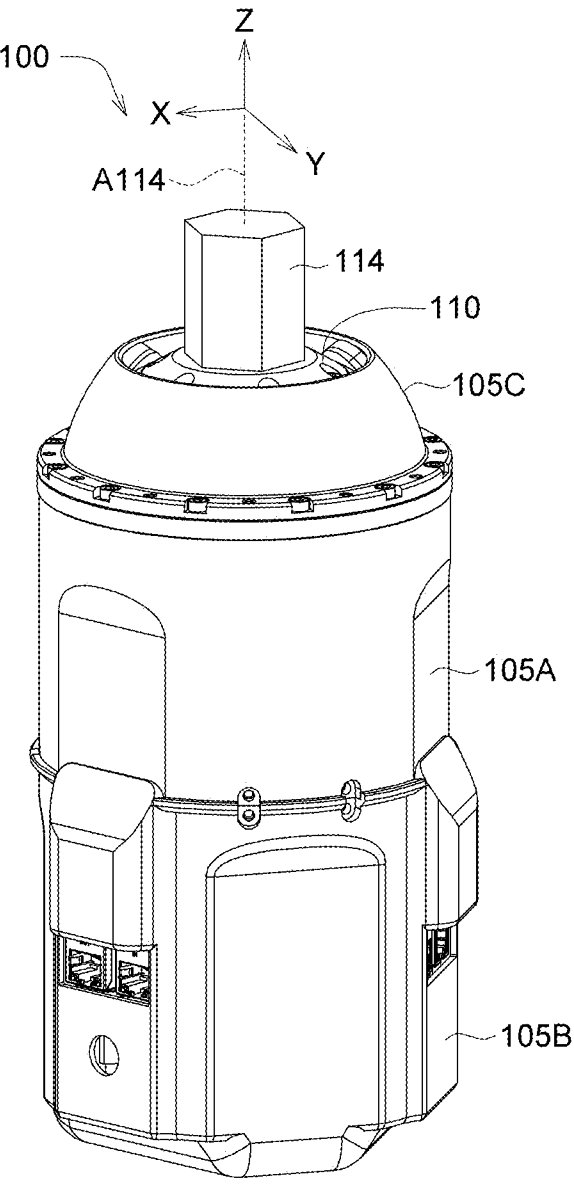
FIG. 2A illustrates a schematic diagram of a robot joint device according to another embodiment of the present invention.
Figure 2B:
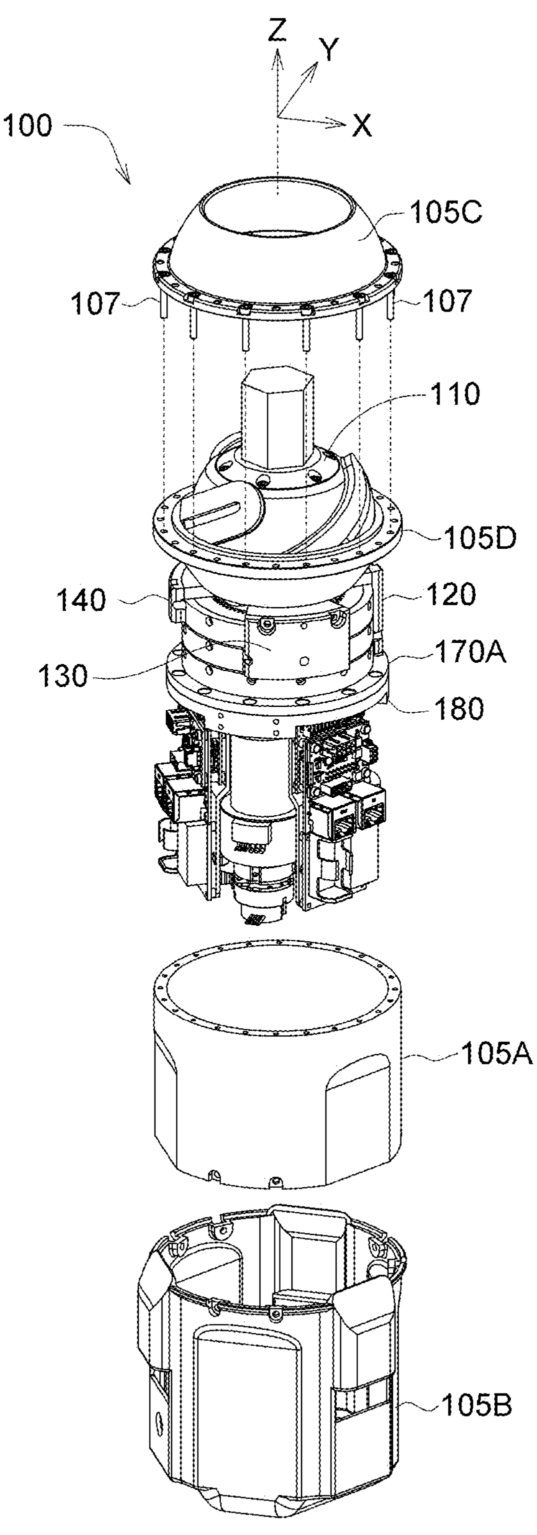
FIG. 2B illustrates an internal schematic diagram of the robot joint device in FIG. 2A.
Figure 2C:
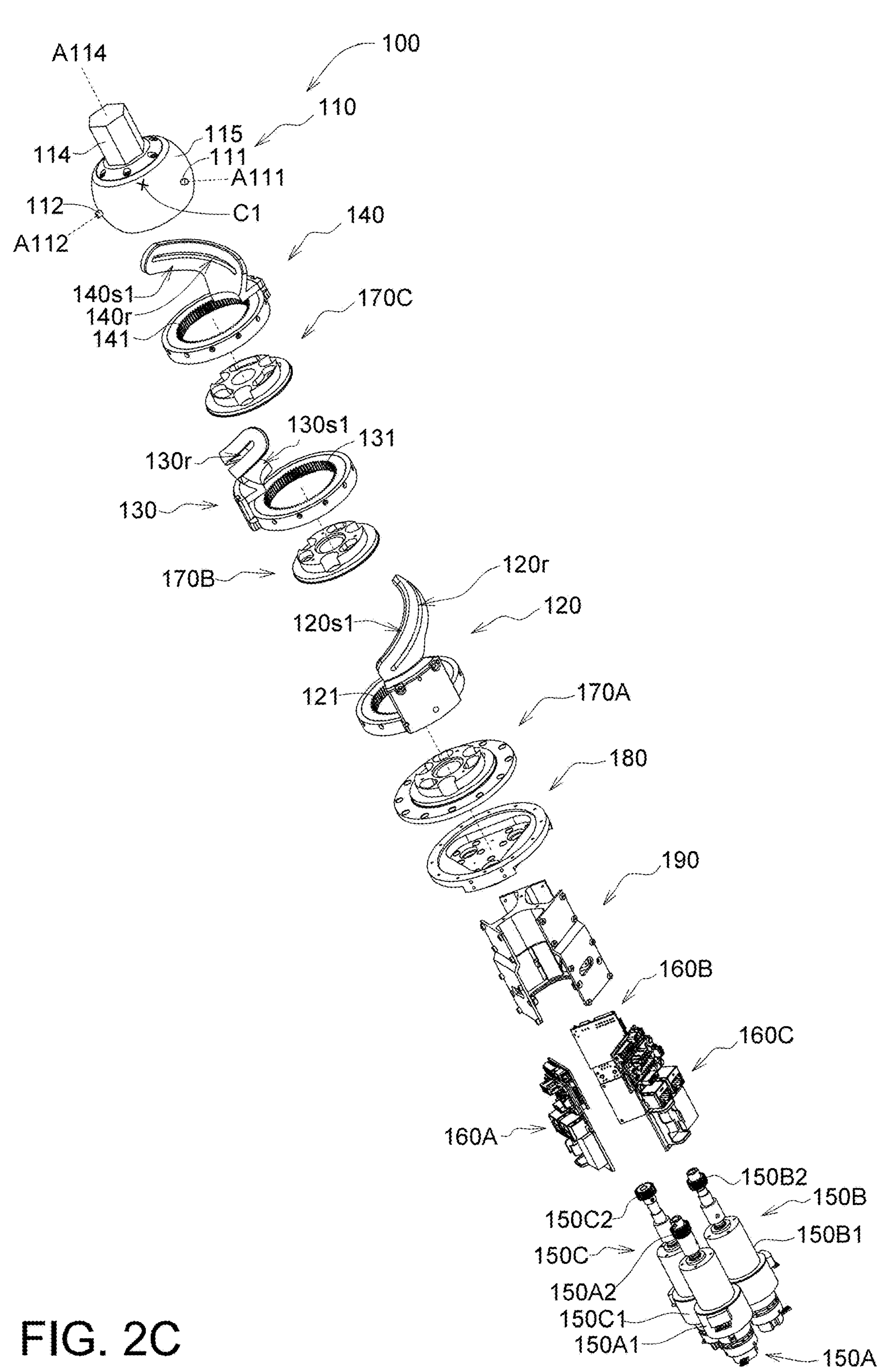
FIGS. 2C to 2D illustrate schematic diagrams of an exploded view of the robot joint device in FIG. 2A viewed from different viewing angles.
Figure 2D:
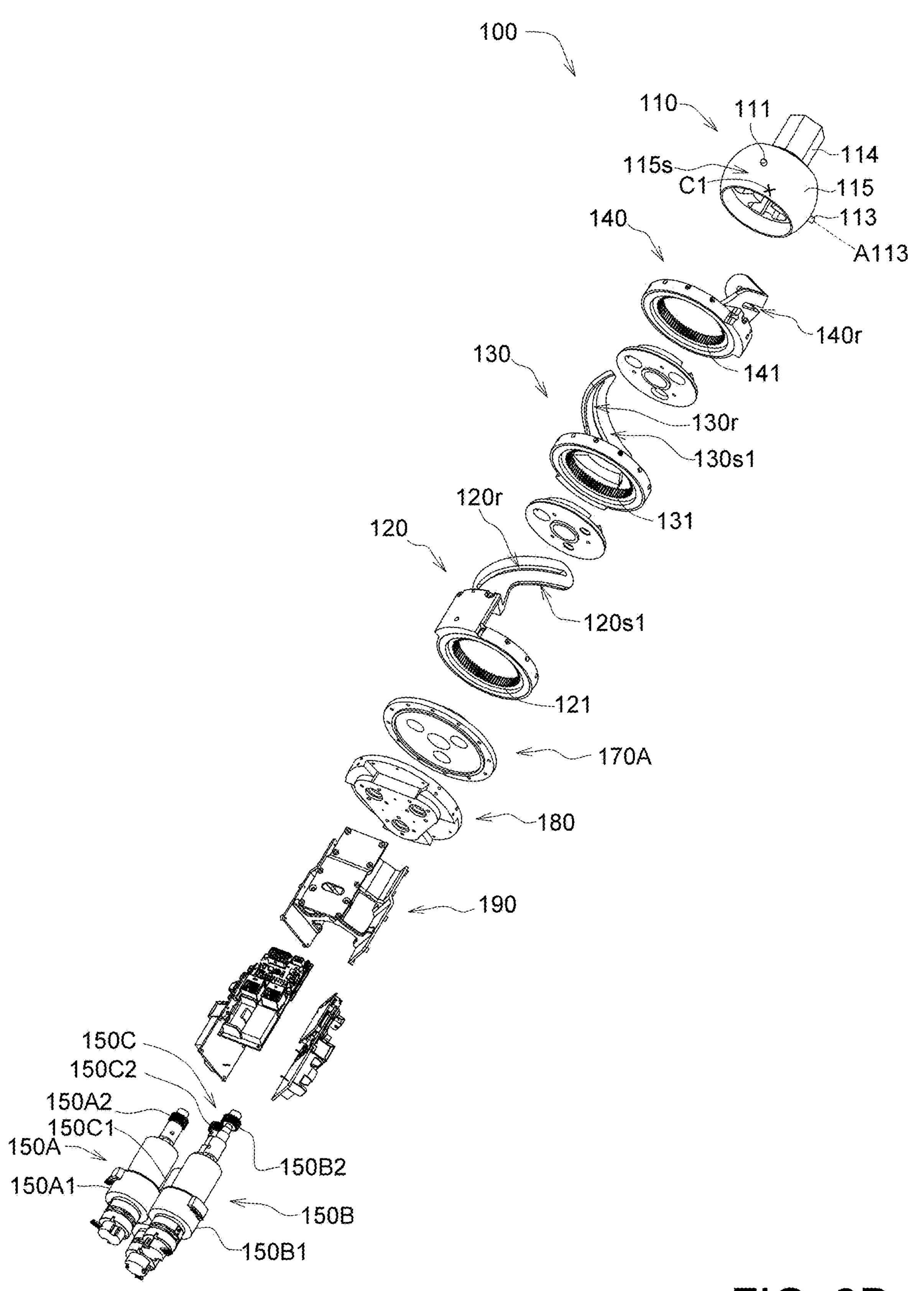

Referring to FIGS. 2A to 2D, FIG. 2A illustrates a schematic diagram of a robot joint device 100 according to another embodiment of the present invention, FIG. 2B illustrates an internal schematic diagram of the robot joint device 100 in FIG. 2A, and FIGS. 2C to 2D illustrate schematic diagrams of an exploded view of the robot joint device 100 in FIG. 2A viewed from different viewing angles.

As illustrated in FIGS. 2A to 2D, the robot joint device 100 includes at least one housing (for example, a first housing 105A, a second housing 105B, a third housing 105C, and a fourth housing 105D), the joint component 110 and the first pivot component 120. The second pivot component 130, the third pivot component 140, a first driving mechanism 150A, a second driving mechanism 150B, a third driving mechanism 150C, a first driving module 160A, a second driving module 160B, a third The driving module 160C, at least one position-limiting component (for example, the first position-limiting component 170A, the second position-limiting component 170B and the third position-limiting component 170C), a connecting component 180 and a bearing component 190.

As illustrated in FIGS. 2A to 2D, the first housing 105A, the second housing 105B and the third housing 105C may cover a portion of the joint component 110, the first pivot component 120, the second pivot component 130, the third pivot component 120 and the third pivot component 140, the first driving mechanism 150A, the second driving mechanism 150B, the third driving mechanism 150C, the first driving module 160A, the second driving module 160B, the third driving module 160C, the first position-limiting component 170A, the second position-limiting component 170B, the third position-limiting component 170C, the connecting component 180 and the bearing component 190, but expose a protruding shaft 114 of the joint component 110. Another connecting device (not illustrated) may be connected to the protruding shaft 114, and the robot joint device 100 may drive the connecting device to move, wherein the connecting device is, for example, another robot joint device or a robot palm (including at least one finger) device.

As illustrated in FIGS. 2A to 2D, the first housing 105A and the second housing 105B may be fixed (for example, using screws) to the connecting component 180. The first housing 105A and the third housing 105C are located on two opposite sides of the fourth housing 105D respectively, and the first housing 105A, the third housing 105C and the fourth housing 105D may be fixed to each other by using at least one screw 107. In addition, the first position-limiting component 170A, the second position-limiting component 170B, the third position-limiting component 170C and the connecting component 180 may be fixed to each other (for example, using at least one screw). As a result, the relative position among the first housing 105A, the second housing 105B, the third housing 105C, the fourth housing 105D, the first position-limiting component 170A, the second position-limiting component 170B, the third position-limiting component 170C and the connecting component 180 are fixed.

As illustrated in FIGS. 2C to 2D, the joint component 110 includes a joint body 115, a first pivot shaft 111, a second pivot shaft 112 and a third pivot shaft 113. The first pivot shaft 111, the second pivot shaft 112 and the third pivot shaft 113 are connected to the joint body 115 and protrude relative to an outer contour surface of the joint body 115. A first central axis A111 of the first pivot shaft 111, a second central axis A112 of the second pivot shaft 112, and a third central axis A113 of the third pivot shaft 113 pass through a center C1 of the joint body 115. As a result, when the first pivot shaft 111, the second pivot shaft 112 and/or the third pivot shaft 113 are driven, the joint body 115 may swing relative to the center C1 (for example, swing around an axis that is substantially parallel to X-axis, Y-axis, or intersects with the X-axis (or Y-axis)) and/or rotates (e.g., about Z-axis). In addition, the joint body 115 is at least a portion of a sphere, and the center C1 of the joint body 115 is the center of the sphere. The joint body 115 has a body outer contour surface 115*s* which is, for example, at least a portion of a spherical surface. The first central axis A111 of the first pivot shaft 111, the second central axis A112 of the second pivot shaft 112 and the third central axis A113 of the third pivot shaft 113 may be perpendicular to the body outer contour surface 115*s* of the joint body 115.

As illustrated in FIGS. 2C to 2D, the first pivot component 120 has a first inner contour surface 120*s*1, the second pivot component 130 has a second inner contour surface 130*s*1, and the third pivot component 140 has a third inner contour surface. 140*s*1. The first inner contour surface 120*s*1, the second inner contour surface 130*s*1 and the third inner contour surface 140*s*1 may conform to the body outer contour surface 115*s*. As a result, when the pivot component (for example, the first pivot component 120, the second pivot component 130 and the third pivot component 130) moves relative to the joint component 110, the pivot component(s) and the joint body 115 of the joint component 110 do not interfere with each other.

As illustrated in 2C and 2D, the first pivot component 120 further has a first slide groove 120*r*, wherein the first inner contour surface 120*s*1 conforms to the body outer contour surface 115*s*, and the first slide groove 120*r* extends outward from the first inner contour surface 120*s*1. For example, the first slide groove 120*r* penetrates the first pivot component 120. In another embodiment, the first sliding groove 120*r* may not penetrate the first pivot component 120. The second pivot component 130 further has a second slide groove 130*r*, and the second slide groove 130*r* extends outward from the second inner contour surface 130*s*1. For example, the second sliding groove 130*r* penetrates the second pivot component 130. In another embodiment, the second sliding groove 130*r* may not penetrate the second pivot component 130. The third pivot component 140 further has a third slide groove 140*r*, and the third slide groove 140*r* extends outward from the third inner contour surface 140*s*1. For example, the third slide groove 140*r* penetrates the third pivot component 140. In another embodiment, the third sliding groove 140*r* may not penetrate the third pivot component 140.

Figure 3A:
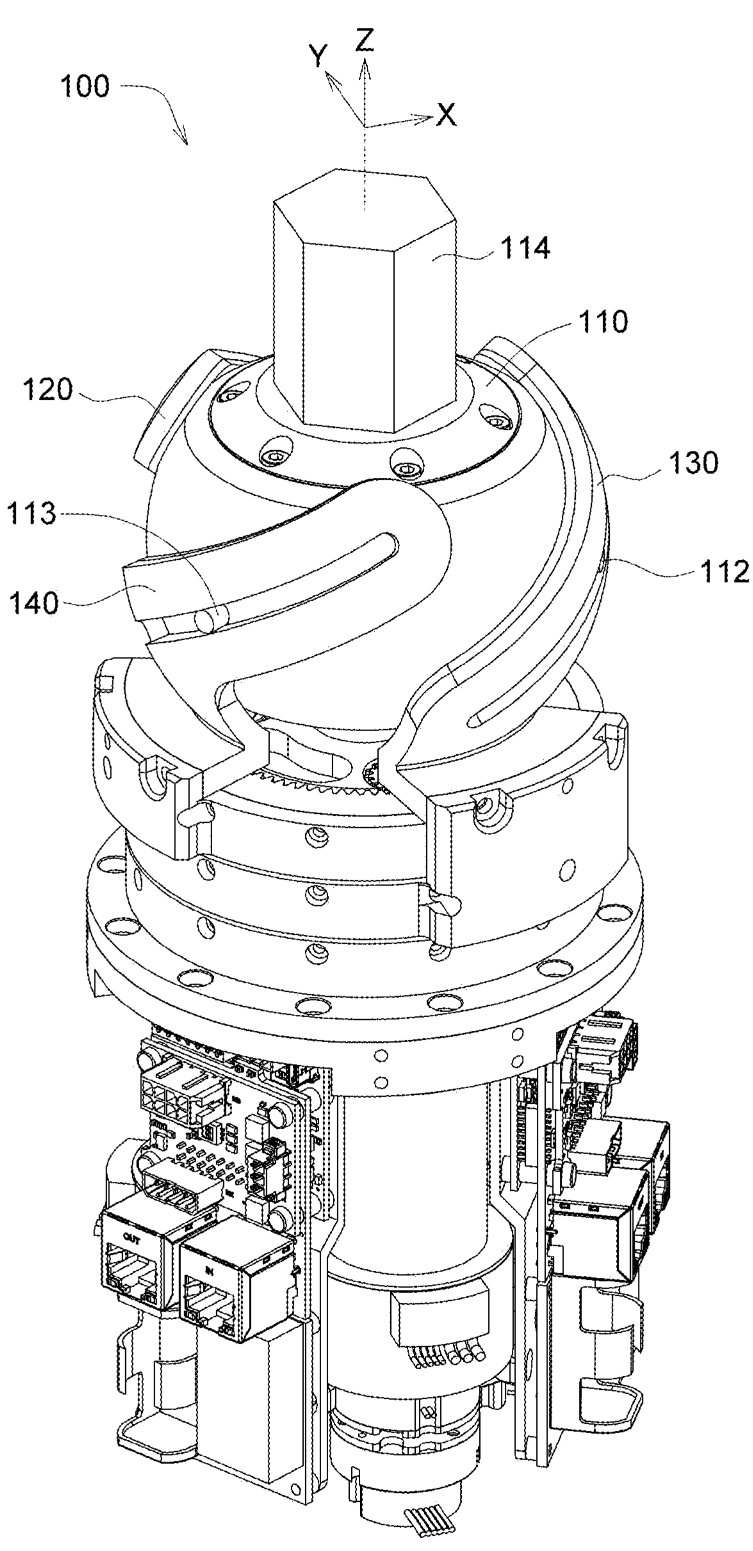
FIG. 3A illustrates an internal schematic diagram of the robot joint device in FIG. 2A.
Figure 3B:
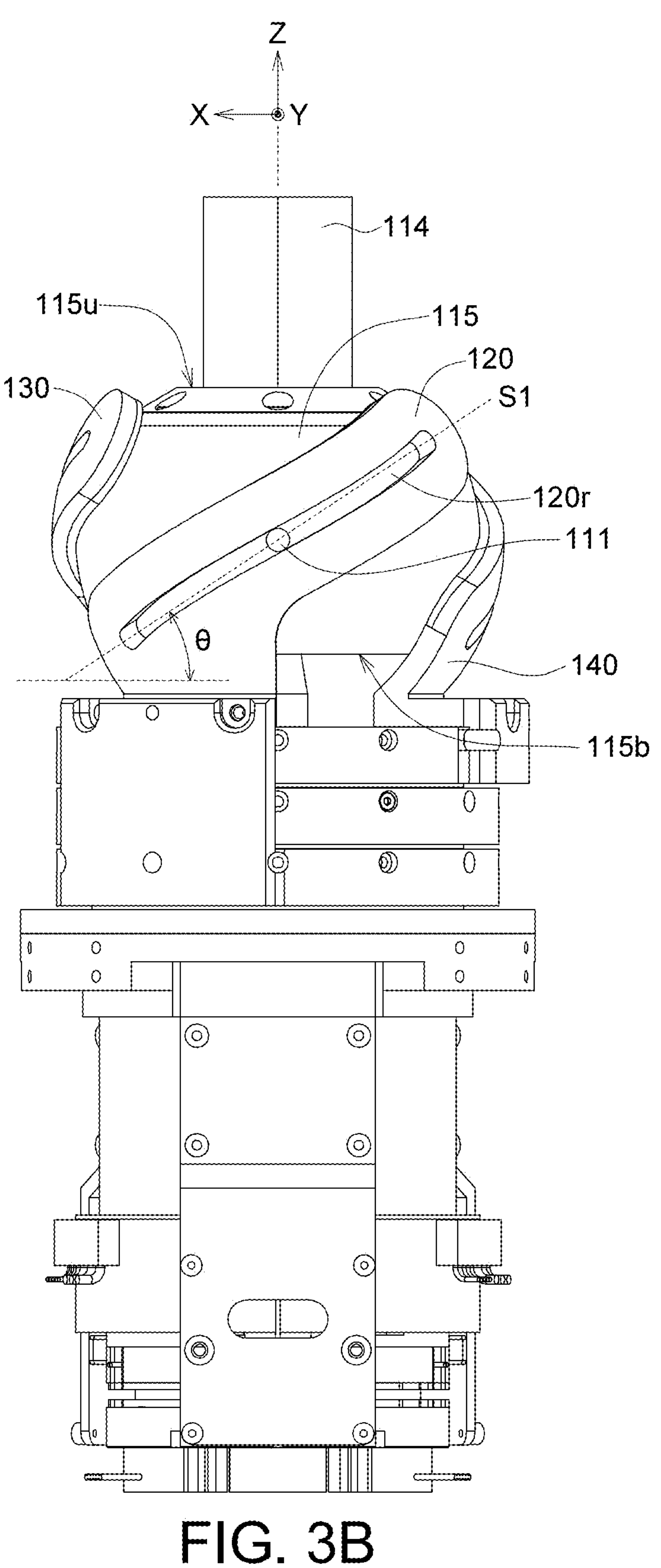
FIG. 3B illustrates a schematic diagram of a side view of the robot joint device in FIG. 3A.

Referring to FIGS. 3A and 3B, FIG. 3A illustrates an internal schematic diagram of the robot joint device 100 in FIG. 2A, and FIG. 3B illustrates a schematic diagram of a side view of the robot joint device 100 in FIG. 3A.

As illustrated in FIGS. 3A and 3B, the first slide groove 120*r* obliquely extends relative to the XY-plane. For example, the first slide groove 120*r* forms an included angle other than 0 degrees relative to the XY-plane. When the joint component 110 is assembled with the first pivot component 120, the first slide groove 120*r* obliquely extends from an upper surface 115*u* of the joint body 115 toward a lower surface 115*b* of the joint body 115. In addition, an included angle included between an extension direction S1 of the first slide groove 120*r* and the XY-plane is θ. The included angle θ is greater than 0 degrees, for example, between 30 degrees and 60 degrees. In addition, the XY-plane is perpendicular to Z-axis, and the joint component 110 may rotate around Z-axis, swing around X-axis, and/or swing around Y-axis. In addition, the second slide groove 130*r* and the third slide groove 140*r* have the technical features the same as or similar to that of the first slide groove 120*r*, and it will not be repeated again here. In an embodiment, the included angle θ between the first slide groove 120*r* and the XY-plane, the included angle between the second slide groove 130*r* and the XY-plane and the included angle between the third slide groove 140*r* and the XY-plane may be equal.

Figure 4A:
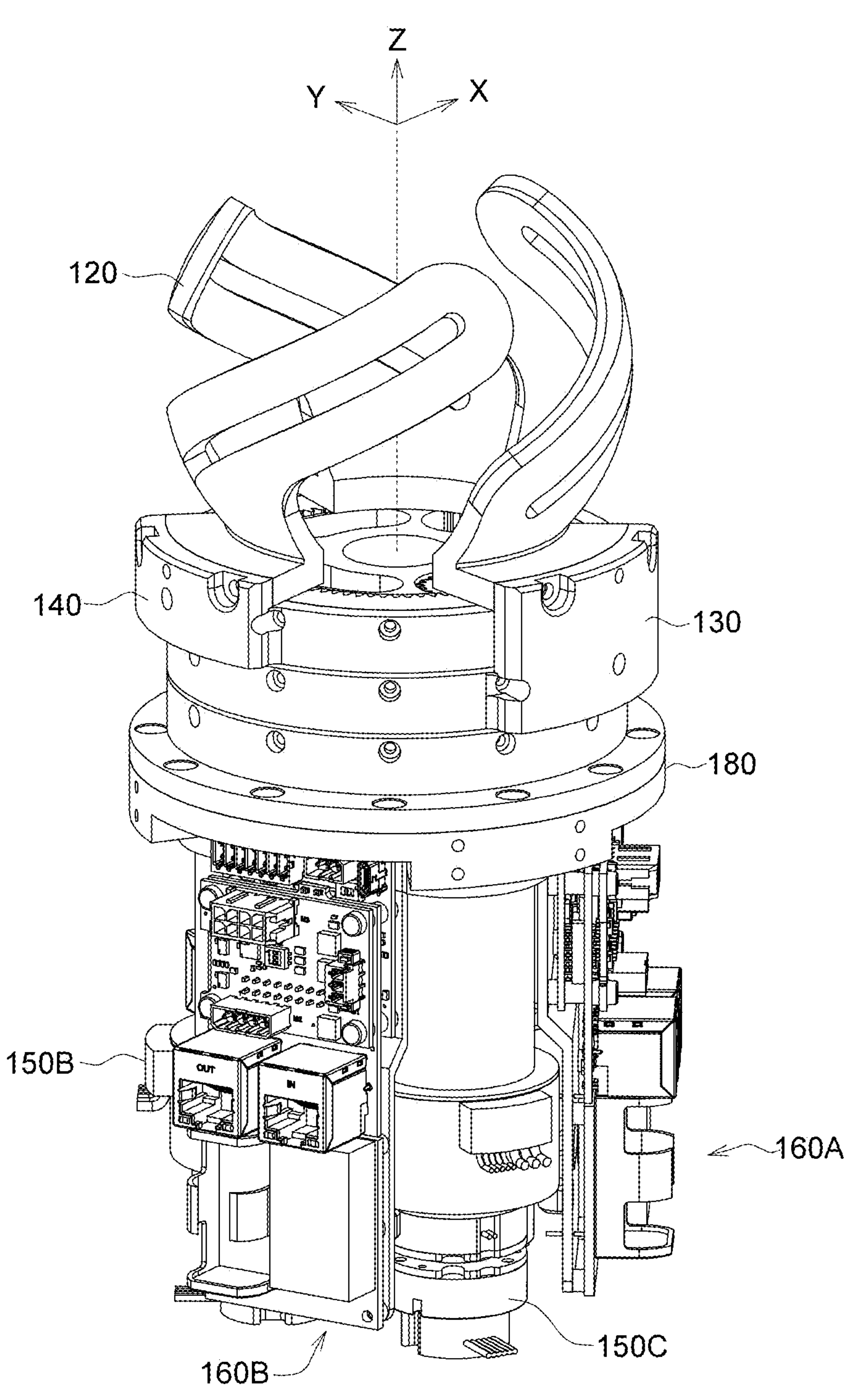
FIG. 4A illustrates a schematic diagram of the robot joint device in FIG. 3A omitting the joint component.
Figure 4B:
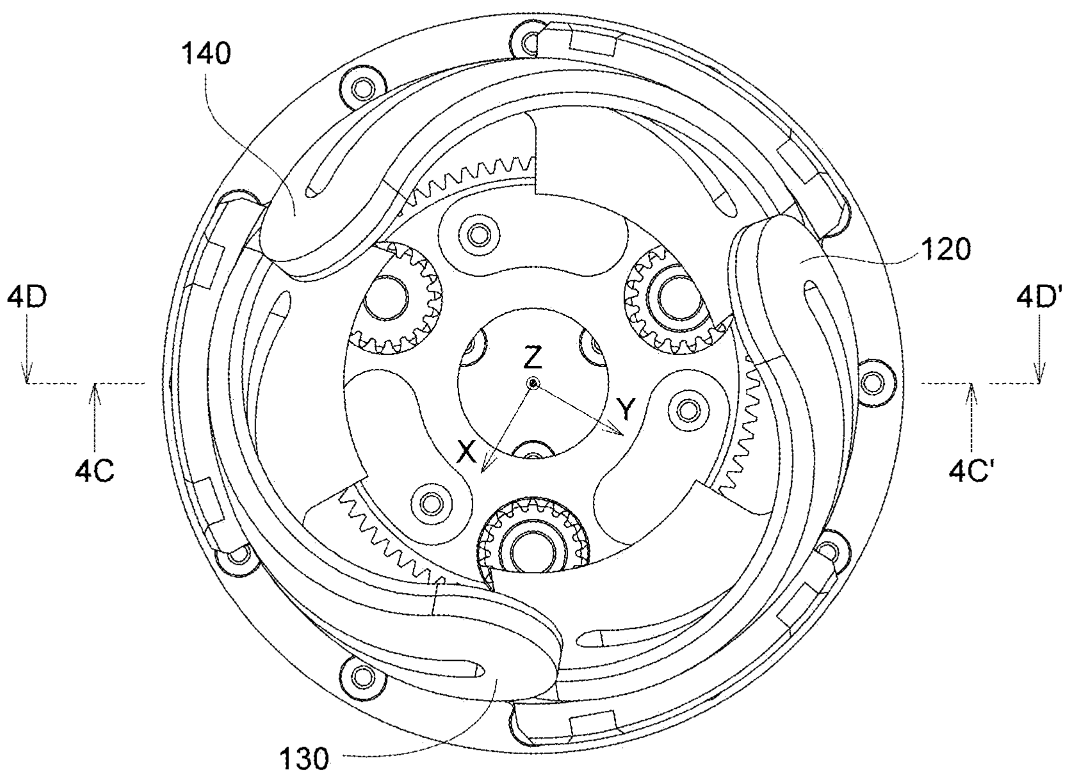
FIG. 4B illustrates a schematic diagram of a top view of the robot joint device in FIG. 4A.
Figure 4C:
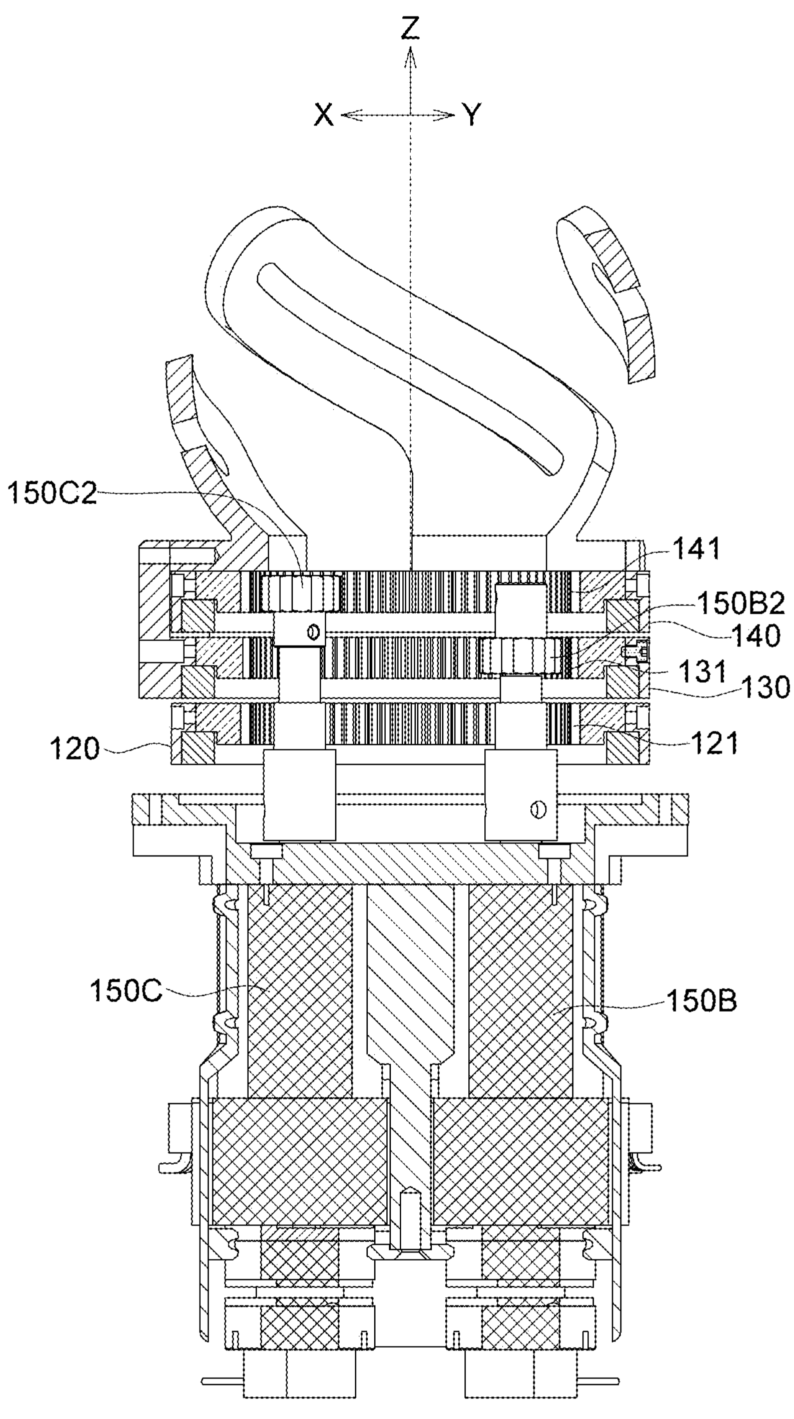
FIG. 4C illustrates a schematic diagram of a cross-sectional view of the robot joint device in FIG. 4B along a direction 4C-4C'.
Figure 4D:
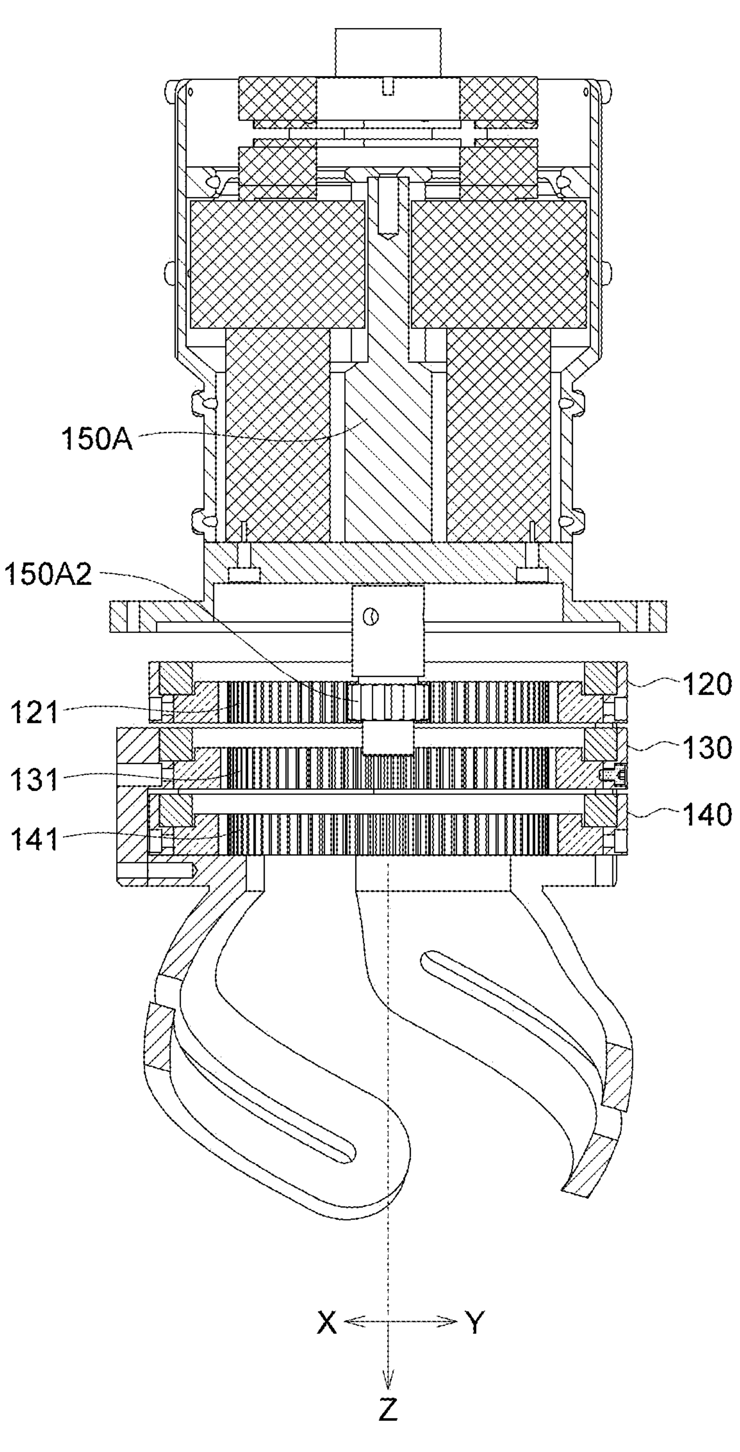
FIG. 4D illustrates a schematic diagram of a cross-sectional view of the robot joint device in FIG. 4B along a direction 4D-4D'.

Referring to FIGS. 4A to 4D, FIG. 4A illustrates a schematic diagram of the robot joint device 100 in FIG. 3A omitting the joint component 110, FIG. 4B illustrates a schematic diagram of a top view of the robot joint device 100 in FIG. 4A, FIG. 4C illustrates a schematic diagram of a cross-sectional view of the robot joint device 100 in FIG. 4B along a direction 4C-4C', and FIG. 4D illustrates a schematic diagram of a cross-sectional view of the robot joint device 100 in FIG. 4B along a direction 4D-4D'.

As illustrated in FIGS. 2C and 4C to 4D, the first pivot component 120 has a first driven gear 121, the second pivot component 130 has a second driven gear 131, and the third pivot component 140 has a third driven gear 141. The first driven gear 121, the second driven gear 131 and the third driven gear 141 are, for example, inner ring gears. The first driven gear 121, the second driven gear 131 and the third driven gear 141 are coaxially disposed, for example. As a result, the first driven gear 121, the second driven gear 131 and the third driven gear 141 may rotate around the same axis, for example, Z-axis. In addition, the first driven gear 121, the second driven gear 131 and the third driven gear 141 may have the same number of teeth N1, for example, between 40 and 90, but it may also be more or less.

As illustrated in FIGS. 2C and 4C to 4D, the first driving mechanism 150A is connected to the first driven gear 121 to drive the first pivot component 120 to rotate. For example, the first driving mechanism 150A includes a first driver 150A1 and a first driving gear 150A2. The first driver 150A1 is connected to the first driving gear 150A2 to drive the first driving gear 150A2 to rotate, thereby driving the first driven gear 121 to rotate. The first driven gear 121 may rotate around +/−Z-axis, so that the first pivot component 120 rotates around +/−Z-axis. The second driving mechanism 150B is connected to the second driven gear 131 to drive the second pivot component 130 to rotate. For example, the second driving mechanism 150B includes a second driver 150B1 and a second driving gear 150B2. The second driver 150B1 is connected to the second driving gear 150B2 to drive the second driving gear 150B2 to rotate, thereby driving the second driven gear 131 to rotate. The second driven gear 131 may rotate around +/−Z-axis, so that the second pivot component 130 rotates around +/−Z-axis. The third driving mechanism 150C is connected to the third driven gear 141 to drive the third pivot component 140 to rotate. For example, the third driving mechanism 150C includes a third driver 150C1 and a third driving gear 150C2. The third driver 150C1 is connected to the third driving gear 150C2 to drive the third driving gear 150C2 to rotate, thereby driving the third driven gear 141 to rotate. The third driven gear 141 may rotate around +/−Z-axis, so that the third pivot component 140 rotates around +/−Z-axis. The first driver 150A1, the second driver 150B1 and/or the third driver 150C1 are, for example, motors. In addition, the first driving gear 150A2, the second driving gear 150B2 and the third driving gear 150C2 have the same number of teeth N2, for example, between 15 and 20, but it may be more or less.

The first driving mechanism 150A, the second driving mechanism 150B and the third driving mechanism 150C may respectively and independently control the rotation of the first pivot component 120, the second pivot component 130 and the third pivot component 140.

As illustrated in FIGS. 2C to 2D, the first driving module 160A, the second driving module 160B and the third driving module 160C may be disposed on the bearing component 190. The bearing component 190 may be fixed to the connecting component 180. As a result, the relative positions among the first driving module 160A, the second driving module 160B, the third driving module 160C, the connecting component 180 and the bearing component 190 are fixed.

Figure 5:
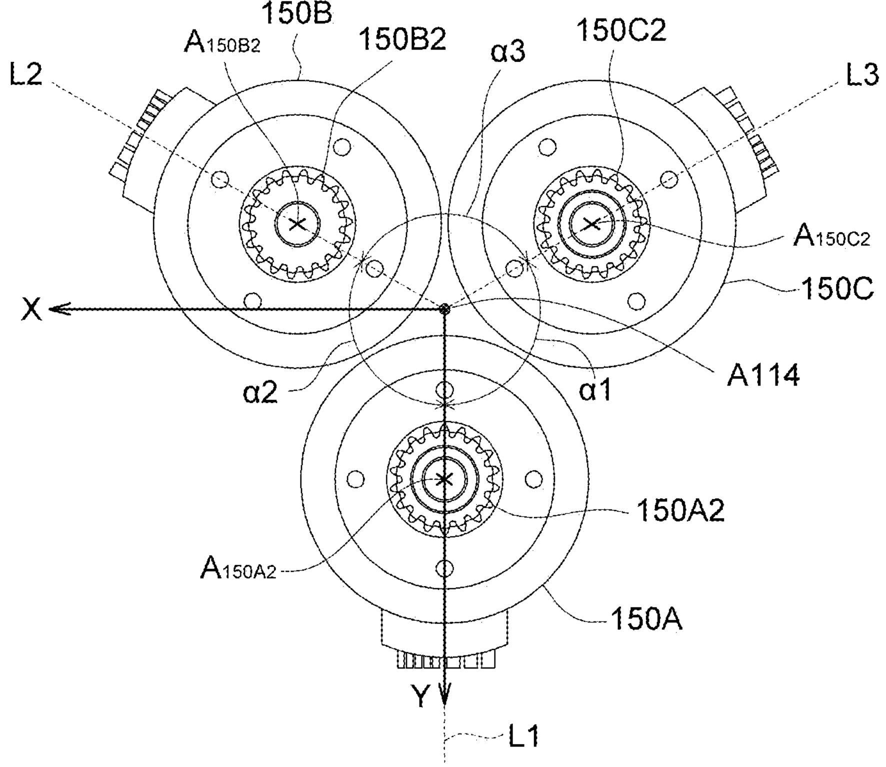
FIG. 5 illustrates a schematic diagram of a top view of the first driving mechanism, the second driving mechanism and the third driving mechanism in FIG. 2C.
Figure 6:
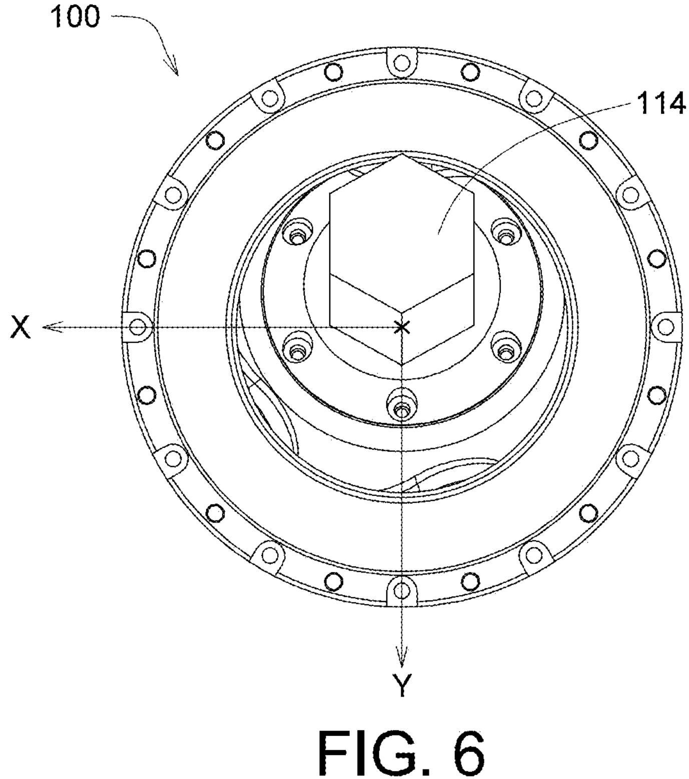
FIG. 6 illustrates a schematic diagram of the joint component of the robot joint device in FIG. 2A swinging around +X-axis.

Referring to FIG. 5, FIG. 5 illustrates a schematic diagram of a top view of the first driving mechanism 150A, the second driving mechanism 150B and the third driving mechanism 150C in FIG. 2C. The joint component 110 has a joint central axis A114. For example, the joint central axis A114 passes through the center C1 of the joint component 110 (when the joint component 110 does not swing around X-axis and Y-axis). The first driving gear 150A2 of the first driving mechanism 150A rotates around a first rotating axis $A_{150A2}$, the second driving gear 150B2 of the second driving mechanism 150B rotates around a second rotating axis $A_{150B2}$, and the third driving gear 150C2 of the third driving mechanism 150C rotates around a third rotating axis $A_{150C2}$. There is a first connection line L1 between the joint central axis A114 and the first rotating axis $A_{150A2}$, there is a second connection line L2 between the joint central axis A114 and the second rotating axis $A_{150B2}$, and there is a third connection line L3 between the joint central axis A114 and the third rotating axis $A_{150C2}$. There is an included angle α1 between the first connection line L1 and the second connection line L2, there is an included angle α2 between the first connection line L1 and the third connection line L3, and there is an included angle α3 between the second connection line L2 and the third connection line L3. In an embodiment, the included angle α1, the included angle α2 and the included angle α3 may be equal. For example, the included angle α1, the included angle α2, and the included angle α3 are all equal to 120 degrees.

As illustrated in the following formulas (1) to (3), Tx represents an output torque of the joint component 110 rotating around X-axis, Ty represents the output torque of the joint component 110 rotating around Y-axis, Tz represents the output torque of the joint component 110 rotating around Z-axis, T1, T2 and T3 represent the driving torques of the first driving mechanism 150A, the second driving mechanism 150B and the third driving mechanism 150C respectively, i represents a reduction ratio (i.e., i=N1/N2) of the driven gear (for example, the first driven gear 121, the second driven gear 131 and the third driven gear 141) and the driving gears (for example, the first driving gear 150A2, the second driving gear 150B2 and the third driving gear 150C2), and the included angle α is equal to the aforementioned included angle α1, included angle α2 or included angle α3.

$$Tx = T1\cdot i\cdot \cot\theta + \frac{T2}{2}\cdot i\cdot \cot\theta * \cos\frac{\alpha}{2} + \frac{T3}{2}\cdot i\cdot \cot\theta\cdot \cos\frac{\alpha}{2} \tag{1}$$

$$Ty = 0 + T2\cdot i\cdot \cot\theta\cdot \sin\frac{\alpha}{2} + T3\cdot i\cdot \cot\theta\cdot \sin\frac{\alpha}{2} \tag{2}$$

$$Tz = T1\cdot i + T2\cdot i + T3\cdot i \tag{3}$$

Assume that the driving torques T1, T2 and T3 are all 2.576 Nm (Newton-meter), the rotation speed is 204 rpm (revolutions per minute), and the included angle θ is equal to 60 degrees, the output torque Tx of the joint component 110 rotating around X-axis is equal to 18.38 Nm, the output torque Ty of the joint component 110 rotating about Y-axis is equal to 21.22 Nm, and the output torque Tz of the joint component 110 rotating about Z-axis is equal to 25.73 Nm, wherein the smallest one of the output torques Tx, Ty and Tz meets the requirements (the output torque being greater than 15 Nm meets the requirement), at this time, the driving torque of the driving mechanism (for example, the first driving mechanism 150A, the second driving mechanism 150B and/or the third driving mechanism 150C) only needs 2.576 Nm which meets the requirement. It shows that the performance specification for single driving mechanism of the robot joint device 100 in the embodiment of the present disclosure is reduced. On the other hand, the smallest one of the output torque Tx, Ty and Tz of the joint component 110 in the embodiment of the present disclosure is 18.38 Nm, and it is higher than 15 Nm and meets the torque requirements for most robot arms.

Figure 7:
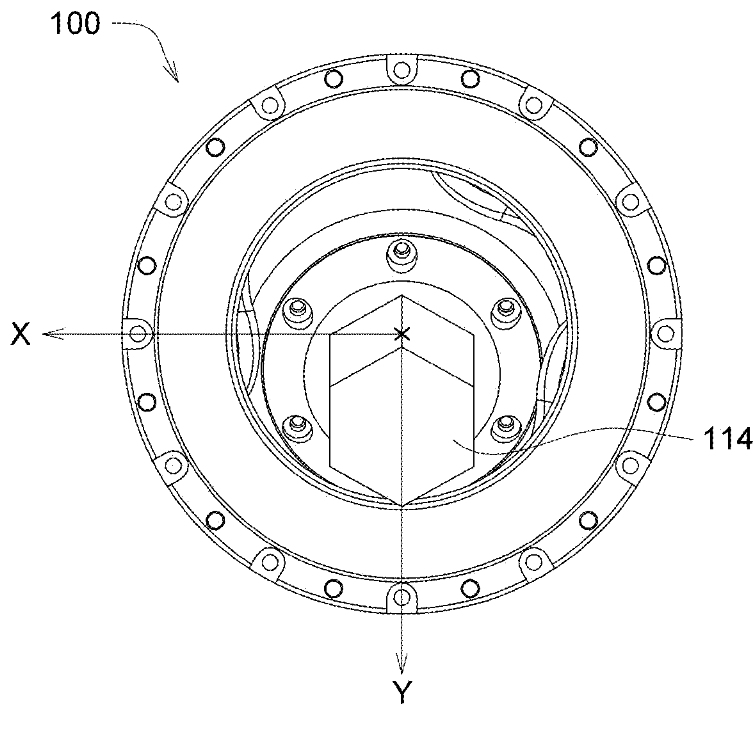
FIG. 7 illustrates a schematic diagram of the joint component of the robot joint device in FIG. 2A swinging around −X-axis swing.
Figure 8:
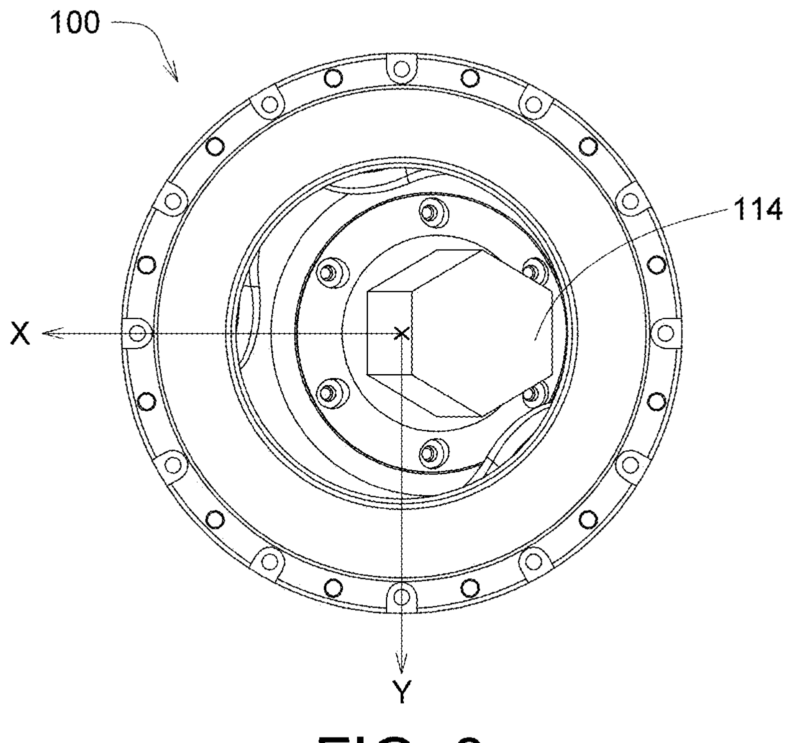
FIG. 8 illustrates a schematic diagram of the joint component of the robot joint device in FIG. 2A swinging around −Y-axis.
Figure 9:
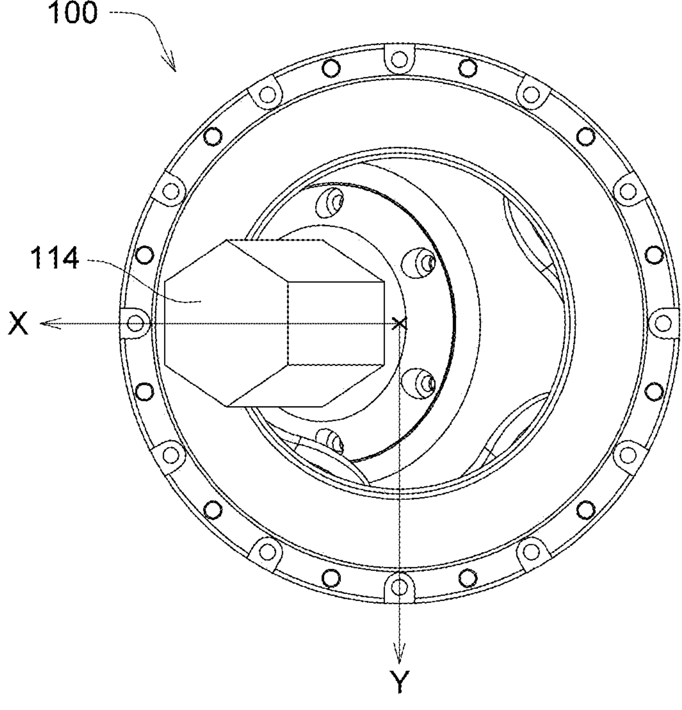
FIG. 9 illustrates a schematic diagram of the joint component of the robot joint device in FIG. 2A swinging around +Y-axis.

Referring to FIGS. 6 to 9, FIG. 6 illustrates a schematic diagram of the joint component 110 of the robot joint device 100 in FIG. 2A swinging around +X-axis, and FIG. 7 illustrates a schematic diagram of the joint component 110 of the robot joint device 100 in FIG. 2A swinging around −X-axis swing, FIG. 8 illustrates a schematic diagram of the joint component 110 of the robot joint device 100 in FIG. 2A swinging around −Y-axis, and FIG. 9 illustrates a schematic diagram of the joint component 110 of the robot joint device 100 in FIG. 2A swinging around +Y-axis.

Table 1 below lists the relationship between the movement modes of the joint component 110 (for example, swinging around +/−X-axis, swinging around +/−Y-axis) and the control of the pivot component. Taking swinging around +X-axis (not rotating around Y-axes and Z-axes) as an example, when the first pivot component 120 rotates around +Z-axis, the second pivot component 130 rotates around −Z-axis and the third pivot component, and the third pivot component 140 rotates around −Z-axis, the joint component 110 swings around +X-axis. Taking swinging around +Y-axis (not rotating around X-axis and Z-axis) as an example, when the first pivot component 120 does not rotate, the second pivot component 130 rotates around +Z-axis, and the third pivot component 140 rotates around −Z-axis, the joint component 110 swings around +Y-axis. Taking swinging around +Z-axis (not rotating around X-axis and Y-axis) as an example, when the first pivot component 120, the second pivot component 130 and the third pivot component 140 all rotate around +Z-axis, the joint component 110 rotates around +Z-axis. In the present embodiment, Y-axis is, for example, the first central axis A111 parallel to the first pivot shaft 111, but the disclosed embodiment is not limited to this.

TABLE 1

| Model control | swing around +X-axis | swing around −X-axis | swing around +Y-axis | swing around −Y-axis | swing around +Z-axis | swing around −Z-axis |
|---|---|---|---|---|---|---|
| first pivot component 120 | rotate around +Z-axis | rotate around −Z-axis | does not rotate | does not rotate | rotate around +Z-axis | rotate around −Z-axis |
| second pivot component 130 | rotate around −Z-axis | rotate around +Z-axis | rotate around +Z-axis | rotate around −Z-axis | rotate around +Z-axis | rotate around −Z-axis |
| third pivot component 140 | rotate around −Z-axis | rotate around +Z-axis | rotate around −Z-axis | rotate around +Z-axis | rotate around +Z-axis | rotate around −Z-axis |

In summary, embodiments of the present disclosure provide a robot joint device which may include a joint component and a plurality of pivot components. These pivot components may be pivotally connected to the same (or single) joint component, and thus it may reduce the outer dimensions of the robot joint device and reduce the weight of the robot joint device (lightweight advantage), and it helps to achieve realistic motion characteristics. In an embodiment, a number of the pivot components may respectively move relative to the joint component to drive the joint component to rotate or swing around at least one of a plurality of the axes perpendicular to each other. Furthermore, one-piece spherical joint design of the present embodiment may provide at least one degree of freedom in the rotation (or swing) axis.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A robot joint device, comprising:
- a joint component comprising a first pivot shaft, a second pivot shaft and a third pivot shaft;
- a first pivot component pivotally connected to the first pivot shaft;
- a second pivot component pivotally connected to the second pivot shaft; and
- a third pivot component pivotally connected to the third pivot shaft;
- wherein the joint component further comprises a joint body, and the joint body is at least a portion of a sphere, and the first pivot shaft, the second pivot shaft and the third pivot shaft are connected to a spherical surface of the sphere of the joint body, and a first central axis of the first pivot shaft, a second central axis of a second pivot shaft and a third central axis of a third pivot shaft pass through a center of the joint body,
- wherein the joint component has a body outer contour surface, the first pivot shaft, the second pivot shaft and the third pivot shaft are fixedly connected to the body outer contour surface, and
- wherein the first pivot component has a first slide groove, the second pivot component has a second slide groove, the third pivot component has a third slide groove, and the first pivot shaft, the second pivot shaft and the third pivot are pivotally connected to the first slide groove, the second slide groove and the third slide groove respectively.

2. The robot joint device according to claim 1, wherein the first pivot component has a first inner contour surface, wherein the first inner contour surface conforms to the body outer contour surface, and the first slide groove extends outward from the first inner contour surface; the second pivot component has a second inner contour surface, wherein the second inner contour surface conforms to the body outer contour surface, and the second slide groove extends outward from the second inner contour surface; the third pivot component has a third inner contour surface, wherein the third inner contour surface conforms to the body outer contour surface, and the third slide groove extends outward from the third inner contour surface.

3. The robot joint device according to claim 2, wherein the joint body has an upper surface and a lower surface, and the first slide groove, the second slide groove and the third slide groove obliquely extend toward the lower surface from an upper surface.

4. The robot joint device according to claim 2, wherein an included angle between the first slide groove and a plane, an included angle between the second slide groove and the plane, and an included angle between the third slide groove and the plane are equal.

5. The robot joint device according to claim 1, wherein the first pivot component has a first driven gear, the second pivot component has a second driven gear, and the third pivot component has a third driven gear; the robot joint device further comprises:

a first driving mechanism connected to the first driven gear to drive the first pivot component to rotate;

a second driving mechanism connected to the second driven gear to drive the second pivot component to rotate; and a third driving mechanism connected to the third driven gear to drive the third pivot component to rotate.

6. The robot joint device according to claim 5, wherein the joint component has a joint central axis; the first driving mechanism has a first rotating axis, the second driving mechanism has a second rotating axis, and the third driving mechanism has a third rotating axis; there is a first connection line between the joint central axis and the first rotating axis, there is a second connection line between the joint central axis and the second rotating axis, and there is a third connection line between the joint central axis and the third rotating axis; an included angle between the first connection line and the second connection line, an included angle between the first connection line and the third connection line, and an included angle between the second connection line and the third connection line are equal.

7. A robot joint device, comprising:

single joint component;

a plurality of pivot components pivotally connected to the single joint component; and a plurality of driving mechanisms configured to respectively and independently control movements of the pivot components;

wherein the single joint further comprises a joint body and a plurality of pivot shafts, the joint body is at least a portion of a sphere, the pivot shafts are connected to a spherical surface of the sphere of the joint body, and a central axis of each pivot component passes through a center of the joint body, wherein the single joint component has a body outer contour surface, the pivot shafts are fixedly connected to the body outer contour surface, and wherein each pivot component has a slide groove, and the pivot shafts are pivotally connected to the slide grooves respectively.

8. The robot joint device according to claim 7, wherein each pivot component has an inner contour surface, wherein the inner contour surface conforms to the body outer contour surface, and the slide groove extends outward from the inner contour surface.

9. The robot joint device according to claim 8, wherein the joint body has an upper surface and a lower surface, and each slide groove obliquely extends toward the lower surface from the upper surface.

10. The robot joint device according to claim 8, wherein there is an included angle between each slide groove and a plane, and the included angles are equal.

11. The robot joint device according to claim 7, wherein each pivot component has a driven gear; the driving mechanisms are connected to the driven gears to drive the pivot components to rotate.

* * * * *